US008362132B2

(12) United States Patent
Wheeler et al.

(10) Patent No.: US 8,362,132 B2
(45) Date of Patent: Jan. 29, 2013

(54) LOW TITANIUM DIOXIDE COATINGS

(75) Inventors: Stephen Arthur Wheeler, Slough (GB); Richard Barcock, Aylesbury (GB); Colin Pearce, Aylesbury (GB); Gary Jefferson, Reading (GB); Anthony David Woods, Slough (GB); Simon Nicholas Emmett, Egham (GB); Javier Perez-Amoros, Reading (GB)

(73) Assignee: Akzo Nobel Coatings International B.V., Arnhem (NL)

( * ) Notice: Subject to any disclaimer, the term of this patent is extended or adjusted under 35 U.S.C. 154(b) by 0 days.

(21) Appl. No.: 13/091,887

(22) Filed: Apr. 21, 2011

(65) Prior Publication Data

US 2011/0318594 A1  Dec. 29, 2011

Related U.S. Application Data

(60) Provisional application No. 61/328,383, filed on Apr. 27, 2010.

(30) Foreign Application Priority Data

Apr. 27, 2010  (EP) ..................................... 10161203

(51) Int. Cl.
*C08K 3/22* (2006.01)
*C09D 125/00* (2006.01)
*B32B 27/30* (2006.01)

(52) U.S. Cl. ........ 524/431; 524/425; 524/446; 524/447; 524/556; 106/436; 106/465; 106/466; 106/468; 106/487

(58) Field of Classification Search .................. 524/425, 524/431, 446, 447, 556; 106/436, 465, 466, 106/468, 487
See application file for complete search history.

(56) References Cited

U.S. PATENT DOCUMENTS

| 4,069,186 | A |   | 1/1978 | Ramig |
| 4,277,385 | A |   | 7/1981 | Carroll et al. |
| 4,800,107 | A | * | 1/1989 | Wickert ..................... 427/427.4 |
| 5,201,948 | A |   | 4/1993 | Fasano et al. |
| 5,340,870 | A |   | 8/1994 | Clinnin et al. |
| 2003/0018103 | A1 |   | 1/2003 | Bardman et al. |

FOREIGN PATENT DOCUMENTS

EP    0 113 435    7/1984

OTHER PUBLICATIONS

European Search Report for EP Application No. 10161203.4, dated Aug. 19, 2010, 4 pages.

* cited by examiner

*Primary Examiner* — Vu A Nguyen

(74) *Attorney, Agent, or Firm* — Kenyon & Kenyon LLP

(57) ABSTRACT

Aqueous coating composition having a PVC from 78 to 85% and free of non-fugitive coalescing solvent, comprising, based on the total volume solids of the dry coating unless otherwise stated, a) opacifying pigment particles comprising from 3 to 10% titanium dioxide and from 0 to 20% of hollow polymeric particles;

b) non-opacifying extender particles comprising calcium magnesium carbonate and/or calcium carbonate and/or nepheline syenite and/or kaolin;

c) polymer binder particles of calculated Fox Tg of from 5 to 25° C. having an acid value of from 15 to 65 mg KOH/g of polymer;

d) dispersant having weight average molecular weight of at least 3500 Daltons, and wherein the dispersant demand of a mixture of the opacifying pigment particles, other than the hollow polymeric particles, of a) and the extender particles of b) is greater than 0.35 wt %, calculated on the weight of the titanium dioxide and extender particles;

e) fugitive coalescing solvent.

18 Claims, 2 Drawing Sheets

LOW TITANIUM DIOXIDE COATINGS

CROSS REFERENCE TO RELATED APPLICATION

This application claims the benefit of U.S. Provisional Application No. 61/328,383, filed on Apr. 27, 2010, which is incorporated herein by reference in its entirety. This application also claims the benefit of the filing date of EPO Application No. 10161203.4, filed on Apr. 27, 2010, which is incorporated herein by reference in its entirety.

BACKGROUND OF INVENTION

The invention relates to reduced energy content pigmented coating compositions, especially pigmented paints of low to medium sheen, also known as matt or soft sheen paints. In particular it relates to paints of pigment volume content from 78 to 85% and having sheen of less than 30% when measured at 85°.

Light colored pigmented paints usually contain high levels of titanium dioxide, $TiO_2$. This is because such pastel shades are predominantly white with a small amount of non-white color added. Titanium dioxide is the best source of whiteness due to its high refractive index relative to typical binders used in paints. Unfortunately, $TiO_2$ requires large amounts of energy to extract it from the ground and then purify. In fact, in known high pigment volume content (PVC) paints of pastel/light color, for example, matt whites and matt light shades as hereinbelow described, the high $TiO_2$ content (typically 10 to 20 vol %) used to achieve the desired color and opacity is the main contributor to the total energy content of the paint.

By energy content, we mean the energy required to extract, refine and manufacture the ingredients comprising the paint; and the energy required to manufacture the paint itself.

Since most energy is generated by burning fossil fuel, high energy content usually results in high carbon dioxide emissions—hence the use of the alternative measure 'embedded $CO_2$' to indicate the energy content.

The adverse effect of such emissions on the global environment, especially climate change, is generally accepted by most serious commentators. Thus, there is a need to reduce the energy consumed in producing such paints.

One approach to this is to reduce the $TiO_2$ content of the paint. However, this simply reduces the opacity of the dried coating and, whilst each coat of dried paint may well have reduced energy content, additional coats will be required in order to achieve opacity. Consequently, any benefit is lost or at least, significantly diminished. Other approaches replace some or all of the $TiO_2$ with extender pigments such as chalk. Whilst such extenders require less energy than $TiO_2$ to extract and refine, the lower refractive index of such extenders is very close to the binders used in paint. As such, they do not scatter light as well as $TiO_2$ and in order to compensate for the reduced amount of $TiO_2$ more extender must be added to the paint to achieve the correct color and opacity. However, this raises the PVC further, eventually to the extent that air is trapped in the dried paint film. Whilst this increases the opacity, it also usually results in poorer wet scrub resistance.

One possible way out of this dilemma is to use calcined clay as this has good opacity and is less detrimental to the scrub resistance. However, manufacture of calcined clay requires clay to be heated to 1000° C. thereby consuming large amounts of energy. Clearly, this does not result in significant energy savings and is thus not a preferred option.

U.S. Pat. No. 4,277,385 discloses paint compositions having PVC between 75 and 85% and further teaches that to avoid cracking in high PVC paint films, the formulation should be free of non-opacifying inorganic pigments (another name for extenders) essentially replacing them with non-film forming solid polymer particles. However, no attempt is made to minimize the $TiO_2$ content in these formulations and, thus the problem of high energy content and high $CO_2$ emissions are not addressed.

European Patent application EP 0113435 describes an aqueous paint having reduced $TiO_2$ content at PVC from 20 to 80%. It teaches to use mixtures comprising pigmented vesiculated polymer beads and larger opaque polymer particles having microvoids—but no pigments, to replace $TiO_2$ whilst maintaining burnish/scrub resistance. However, as pointed out in that application, pigmented vesiculated polymer beads themselves contain $TiO_2$ and thus add considerably to the $TiO_2$ content. This does little, if anything, to reduce the total energy content of the paint. Pigmented vesiculated polymer beads are polymer particles containing both and $TiO_2$ microvoids.

Thus, there is a need for improved paint compositions having reduced $TiO_2$ content and thus low energy content whilst also having good opacity and good wet scrub resistance.

SUMMARY OF INVENTION

Accordingly, there is provided an aqueous pigmented coating composition having a PVC of from 78 to 85% comprising, based on the total volume solids of the dry coating unless otherwise stated,
    a) opacifying pigment particles comprising
        i) from 3 to 10% titanium dioxide
        ii) from 0 to 20% of hollow polymeric particles
    b) non-opacifying extender particles comprising
        i) calcium magnesium carbonate and/or
        ii) calcium carbonate and/or
        iii) nepheline syenite and/or
        iv) kaolin
wherein i)+ii)+iii)+iv)=40 to 80% and iv) is 0 to 20%
    c) polymer binder particles of calculated Fox Tg of from 5 to 25° C. having an acid value of from 15 to 65 mg KOH/g of polymer and wherein the polymer particles are derived from acrylic monomers and optionally further comprising styrene and/or its derivatives
    d) dispersant having a weight average molecular weight of at least 3500 Daltons and selected on the basis that the demand for dispersant of a mixture of the opacifying pigment particles, other than the hollow polymeric particles, of a), and the extender particles of b) is greater than 0.35 wt %, calculated on the weight of the titanium dioxide and extender particles, as determined by the method hereinbelow described.
    e) fugitive coalescing solvent
wherein the composition is free of non-fugitive coalescing solvent.

DETAILED DESCRIPTION

Figure 1:
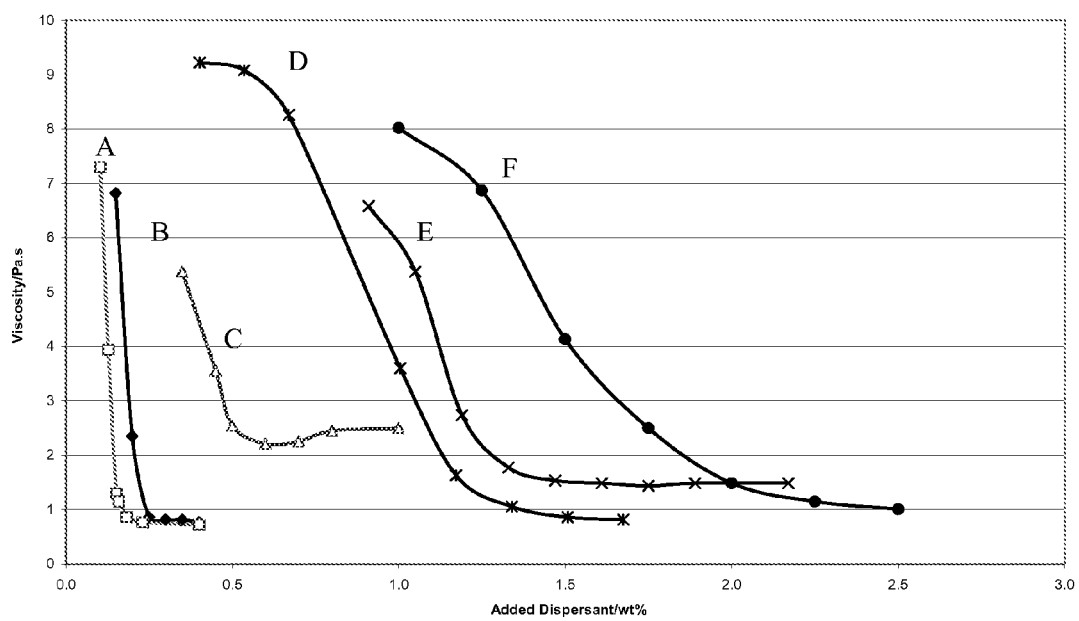
FIG. 1 shows a plot of viscosity versus added non volatile dispersant for various dispersants.

Preferably, the pigment volume content is from 79 to 85, more preferably from 80 to 85, even more preferably from 80 to 84, and most preferably from 81 to 83%. Any difference between the actual PVC and the sum of a) and b) is made up with other non-opacifying extender pigments as defined hereinbelow.

Preferably, the opacifying pigment particles are white.

More preferably, the opacifying pigment particles consist of $TiO_2$ and hollow polymer particles. Even more preferably, the opacifying pigment particles consist of $TiO_2$ only. $TiO_2$ produced by the well known chloride process is preferred in this invention as it requires less energy to manufacture and thus introduces less embedded $CO_2$ to the coating.

The titanium dioxide is preferably in the rutile form as anatase is a less efficient scatterer and thus more is required to achieve the same degree of opacity.

Preferably, the $TiO_2$ comprises 3 to 9, more preferably from 3 to 8, even more preferably from 5 to 8, yet more preferably from 6 to 8, still more preferably from 5 to 7 and most preferably from 6 to 7 vol % of the composition.

Hollow polymeric, preferably spherical, particles may also be used to provide white opacity. Suitable such particles contain a void of from 30 to 50% by vol of the particle. Such particles are available as aqueous dispersions under the tradename Ropaque™. However, the composition preferably contains less than 10% by volume of such polymeric hollow sphere white pigments because they contribute significantly to the energy content of the paint. Additionally, they tend to provide unwanted gloss to the dried paint film following drying. More preferably, the composition is free of such hollow polymeric particles.

Similarly, calcined clay, a white pigment may be used as a partial replacement for $TiO_2$. However, since the production of calcined clay is itself energy intensive, care must be taken to limit the amount of calcined clay used in the formulation. To take maximum advantage of the energy savings to be made it is preferred that the coating composition is free of calcined clay. Nevertheless, preferably, up to 30 vol % of calcined clay may be used, more preferably from 5 to 20 vol % and most preferably from 10 to 15 vol %. Pigmented vesiculated polymer beads are also preferably avoided.

Of course, colored opacifying pigments of different hue may also be added to the compositions of the present invention, in addition to the other opacifying pigment particles, to produce pastel/light colors as discussed in greater detail hereinbelow.

By non-opacifying extender particles is meant inorganic particles that have a refractive index the same as or similar to that of the polymer binder. Since the opacifying strength of a particulate material is a consequence of the difference in refractive index of the material and the medium in which it is dispersed and its particle size, such extenders are regarded essentially as non-opacifiers, see page 35 to 37, Paint and Surface Coatings—theory and practice, edited by R. Lambourne and published by John Wiley and Sons. That is not to say that they do not contribute to opacity at all, but rather that any contribution is small in comparison to $TiO_2$.

Extenders are usually not pure white and can provide some grey or yellow hue to the coating.

Suitable examples of non-opacifying extender particles include calcium magnesium carbonate, calcium carbonate, nepheline syenite, kaolin, talc, silica, diatomaceous silica, mica and calcium sulphate. Preferably, the non-opacifying extender particles are selected from the group consisting of calcium magnesium carbonate, calcium carbonate, nephelene syenite and kaolin. Preferably, the non-opacifying extender particles are selected from the list consisting of calcium magnesium carbonate, calcium carbonate, nephelene syenite and kaolin. Even more preferably they are selected from the group consisting of calcium magnesium carbonate, calcium carbonate and kaolin.

The mineral known as dolomite is a convenient and cost effective source of calcium magnesium carbonate, $CaMg(CO_3)_2$. Dolomite is a preferred source of calcium magnesium carbonate for use in the present invention. It is available in powder form of differing mean particle sizes.

Suitable forms of calcium carbonate include calcite including precipitated calcite. Socal® P3 is an example of suitable precipitated calcium carbonate, in the form of calcite. A suitable ground calcium carbonate is Omyacoat® 850 OG.

Nepheline syenite can be used to partly or wholly replace the calcium carbonate.

Kaolin, $Al_2Si_2O_5(OH)_4$, is a type of clay. Adding kaolin above 20 vol % to the composition (based on the dry coating) results in poor wet scrub resistance. Furthermore, at such high levels of kaolin, the coating viscosity is too high to allow easy application using conventional application techniques—such as rollers or brushes—and allow the paint to flow to produce an acceptably smooth finish. Advantageously, the amount of kaolin should be from 0.5 to 20, more preferably from 5 to 15 and most preferably from 6 to 12 vol %.

Preferably, the non-opacifying extender particles comprise from 50 to 75, more preferably from 50 to 70, and most preferably from 55 to 67 vol % of the dry coating.

Advantageously, from 20 to 50% of the total volume solids of the dry coating should comprise extender particles having mean particle size $d_{50}$ of <2 microns. This ensures that the $TiO_2$ particles are sufficiently spaced apart so that scattering is efficient and therefore opacity optimized.

The particle sizes of the extenders are quoted as d50 diameters. This means that 50% of the particles by volume are below this diameter.

The binder comprises an aqueous dispersion of polymer binder particles, often referred to as latex. More preferably, such dispersions are made using emulsion polymerization methods.

For simplicity, the word 'polymer' in this specification is used to cover homopolymers and copolymers comprising two or more monomer variants.

The polymer comprising the binder particles is preferably a styrene-acrylic copolymer or a pure acrylic.

By 'pure acrylic' is meant that the polymer is derived only from monomers selected from the esters of acrylic acid and methacrylic acid and the acids themselves.

By 'styrene-acrylic' is meant that some styrene and/or its copolymerizable derivatives are copolymerized in the polymer. Suitable such styrene derivatives include α-methyl styrene and vinyl toluene.

More preferred are styrene-acrylic polymer particles as these require the least amount of energy to produce them compared to the pure acrylics, and most preferably, the polymer binder in the present invention is derived from styrene, butyl acrylate and a copolymerizable acid. Most preferably, the copolymerizable acid is acrylic acid and/or methacrylic acid.

Preferably, the binder level of the coating is from 5 to 20%, more preferably 5 to 15 and most preferably from 8 to 15% calculated on volume solids.

Suitable acrylic monomers include alkyl esters of acrylic or methacrylic acid such as methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, decyl acrylate, benzyl methacrylate, isobutyl methacrylate, isobornyl methacrylate, the hydroxyalkyl esters of the same acids such as 2-hydroxyethyl acrylate, 2-hydroxyethyl methacrylate, and 2-hydroxypropyl methacrylate.

The acid value of the polymer is preferably from 15 to 60, more preferably from 15 to 55, even more preferably from 15 to 45 and most preferably from 16 to 30 mg KOH/g non-vol polymer. Below an acid value of 15 mg KOH/g polymer produces dried paint of poorer wet scrub resistance, whilst above 65 mg KOH/g polymer tends to degrade the wet scrub resistance of the dried paint.

The acid value is varied by copolymerizing acid functional monomers into the polymer comprising the particles. Suitable such monomers include acrylic acid, methacrylic acid and maleic acid or its anhydride. Preferably, the acid used is acrylic acid.

Polymers of mean particle size no more than 0.3 μm are preferred as they are better at binding together the particulate components of the composition.

Preferably, the number average mean particle size of the polymer particles is from 0.05 to 0.30 μm, more preferably from 0.07 to 0.15 μm and most preferably from 0.08 to 0.14 μm. The number refers to the diameter of the particles. The smaller particle size is preferred as it results in improved scrub resistance, which is particularly important at the high PVC of the present invention.

The glass transition temperature, Tg, of the polymer binder can be adjusted by the choice of monomers and the relative amounts of each comprising the polymer. Preferably, it is from 6 to 21° C., more preferably from 6 to 19° C., even more preferably from 6 to 16° C.

For the avoidance of doubt, any reference to Tg in this specification is to calculated Fox Tg unless otherwise stated.

When higher Tg polymers are used, more coalescing and/or plasticizing solvents are required to enable a coherent coating film to form at normal room temperature of approximately 20 to 25° C. Lower Tg polymers are preferred as these can film form effectively with reduced levels of solvents thereby keeping both the volatile organic content of the paint and the energy content of the paint to a minimum.

Pigment dispersants generally comprise a hydrophilic portion and a hydrophobic portion and, depending on the nature of the dispersing medium and the pigment surface, one portion will have a greater affinity for the pigment surface and the other portion for the dispersing medium. In this way a stable dispersion of pigment dispersed in the medium can be produced.

In the present invention, the dispersant is required to disperse and stabilize the non-polymeric opacifying pigments (including any color pigments) and non-opacifying extender particles. The weight average molecular weight of the dispersant must be at least 3500 Daltons and the dispersant demand according to the test method described hereinbelow must be greater than 0.35 wt % of non-vol dispersant calculated on the weight of the inorganic opacifying pigments and non-opacifying extender particles. Dispersants which do not satisfy these two requirements produce dried films which are unacceptable for wet scrub resistance.

Preferably, the weight average molecular weight of the dispersant is at least 4000, more preferably 5000 and most preferably 6000 Daltons. The upper limit of the weight average molecular weight is preferably 50000 Daltons, more preferably 40000, even more preferably 30000, still more preferably 20000 and most preferably 15000 Daltons. The most preferred average molecular weight of the dispersant is from 3500 to 20000 Daltons.

The dispersant demand is the minimum amount of dispersant which, when added to a dispersion of non-polymeric opacifying pigment particles (including any color pigments), and extenders, produces a minimum viscosity. By 'minimum viscosity' is meant that further addition of dispersant, usually as a solution, does not produce any further drop in viscosity.

A suitable method to estimate the dispersant demand includes the following steps: i) gradually add dispersant to an aqueous dispersion of the non-polymeric opacifying pigment (including any color pigments) and extender particles and monitor the viscosity of the resulting mixture to determine the minimum viscosity; and ii) identify the minimum amount of dispersant added to reach the minimum viscosity as the dispersant demand.

An even more preferred method is described in the test procedures.

Suitable dispersants for use in the present invention include Orotan™ 681, Orotan™ 731 and Orotan 2002. Each of these has molecular weight greater than 3500 Daltons and the dispersant demand is in accordance with the test. Dispex HDN is another dispersant suitable for use in the present invention and is described by the manufacturer as 'a hydrophobic sodium salt of an acrylic copolymer'.

The method for estimating the dispersant demand is described hereinbelow.

Pastel colors are usually produced by adding small amounts of various color pigments, in the form of a concentrated dispersion (also known as colorants or tinters), to a white paint.

In order to achieve the desired scrub resistance it is important that the coalescing solvent is fugitive, meaning that it must leave the paint film. Depending on the solvent and the polymer composition of the binder, this may happen very quickly or may take some days. For guidance, we have found that a coating such as example 1 of the invention (2 wt % Texanol on liquid paint) contains only 0.06 wt % of Texanol in the film after 24 hrs of drying under drying ambient conditions and only 0.01 wt % after a further six days.

Preferably, the fugitive coalescing solvent is able to reduce the calculated Fox Tg of the polymer to from −10 to −80° C., more preferably to from −10 to −60° C., even more preferably to from −10 to −40° C. and most preferably to from −10 to −20° C. The reduction is preferably achieved using up to 4 wt %, even more preferably up to 3 wt %, yet more preferably up to 2 wt %, still more preferably up to 1 wt % and most preferably up to 0.5 wt % calculated on the liquid formulation.

The extent to which a coalescing solvent reduces the calculated Fox Tg of a particular polymer may be calculated according to equation 1:

$$1/Tg = V_p/Tg_p + \alpha V_s/Tg_s \qquad \text{equation 1}$$

where $Tg_p$ and $Tg_s$ is the glass transition temperature of the polymer and the solvent respectively;
Tg is the glass transition temperature of the plasticized system;
$V_p$ and $V_s$ are the volume fractions of the polymer and the solvent respectively;
α is a factor accounting for small changes in plasticizing efficiency and is assumed to be 1 for the purposes of this invention.

Suitable fugitive coalescing solvents include Lusolvan™ FBH (di-isobutyl ester of a mixture of dicarboxylic acids), Lusolvan™ PP (di-isobutyl ester of a mixture of dicarboxylic acids), Loxanol™ EFC 300 (linearic ester), Buty Carbitol™, Butyl Cellosolve, Dowanol™ EPh (ethylene glycol phenyl ether), Dowanol™ PPh (propylene glycol phenyl ether), Dowanol TPnB (tripropylene glycol n-butyl ether), Dowanol™ DPnB, DBE 9™ (a mixture of refined dimethyl gluterate and dimethyl succinate), Eastman DB™ solvent, Eastman EB™ (ethylene glycol monobutyl ether), Texanol™ (2,2,4-trimethyl-1,3-pentanediol monoisobutyrate), Dapro™ FX 511, Velate™ 262, Arcosolve™ DPNB, Arcosolve™ TPnB and benzyl alcohol.

A list of solvents and their glass transition temperatures can be found in the article 'An Applied Approach to Film Formation' by J W Taylor and T D Klots, presented at the 29th Annual Waterborne, High Solids and Powder Coatings Symposium.

Some representative glass transition temperatures of solvents are listed below:

| | |
|---|---|
| Pamolyn™ 300 | −80° C. |
| Texanol™ | −84° C. |
| Arcosolv™ PtB | −88° C. |
| Carbitol™ Acetate | −95° C. |
| Butyl carbitol™ acetate | −100° C. |

Thickeners are used in coating compositions to control the viscosity and rheology profile of the compositions. Suitable rheology modifiers for use in the present invention include carboxymethyl cellulose types such as Blanose™ 731; hydroxyethyl cellulose such as Natrosol™ 250 and Tylose™ H grades; hydrophobically modified hydroxyethyl cellulose such as Natrosol™ plus and Tylose™ HX grades; ethyl and ethylmethyl hydroxyethyl cellulose such as Beromocoll™ EHM grades; non-ionic synthetic associative thickener (NSAT's) such as Acrysol™ RM825, Acrysol™ SCT 275, Acrysol™ RM2020, Aquaflow™ NHS300, Coapur™ 830W, Rheolate™ 450, Bermodol™ PUR grades; hydrophobically modified alkali swellable emulsion (HASE) thickeners such as Acrysol™ TT935, Acrysol™ DR73, Ciba Rheovis™; Alkali swellable synthetic thickeners (ASST).

The NSAT, HASE, ASST and HEUR type thickeners are preferred over the cellulosic types.

The benefits of the invention are advantageously achieved in colored coating compositions normally requiring high levels of $TiO_2$. Such colors are the greys and lightly colored coatings, often referred to as pastel or light colors, and of course, the whites.

These, and all colors, can be defined using the well known Y, $C^*$, $h^*$ system. In the system, any color can be represented by
i. its hue, depicted by $h^*$
ii. its chroma, $C^*$,
iii. its light reflectance value, Y These terms are defined scientifically by the Commission Internationale de l'Eclairage (CIE) [see 'International Lighting Vocabulary', 4th Edition, published IEC/CIE 017.4-1987. ISBN 978 3 900734 07 7].

For the avoidance of any doubt, any reference to coating color in this specification is to the color of the coating when dry, unless otherwise stated.

Hue is a measure of how close the color is to red, yellow, green and blue. It is depicted by hue angle ranging from 0 to 360° where the angle defines the position of the hue in color space, where red, yellow, green and blue are at angles of 0, 90, 180 and 270° respectively. Angles between these 'cardinal points' indicate intermediate colors, e.g., a hue angle of 45° is a reddish yellow (orange) color.

Chroma is a measure of color intensity, i.e., the extent to which it is either a pastel/light color or a strong color or something in between. Chroma can take values from 0 to 100 with the higher numbers indicating stronger colors. Colors having a chroma value of 0 are 'neutral' greys lying on an axis from black to white.

The light reflectance value is a measure of the perceived lightness of the color, ranging from 0 to 100, with 0 representing black and 100 white.

Figure 2:
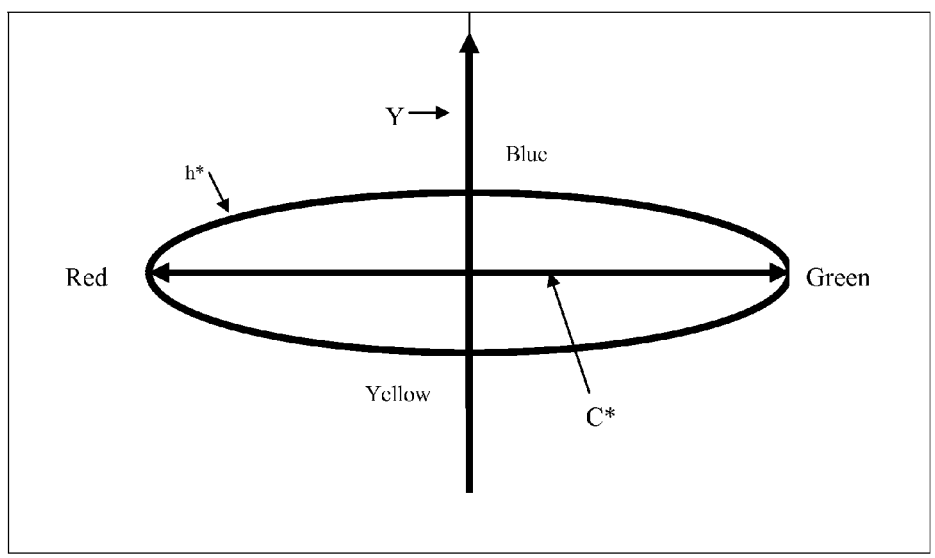
FIG. 2 shows a simplified representation of the Y, C*, h* system for defining a color, wherein Y is its light reflectance value, C* is its chroma, and h* is its hue.

FIG. 2 shows a simplified representation of the Y, $C^*$, $h^*$ system. It shows a slice of color space at about the mid point of the light reflectance value, Y, range. The Y axis runs from 0 to 100. Red, yellow, green and blue are shown in their appropriate positions on the hue, circle. The $C^*$ axis runs from zero at the origin to 100 at the perimeter. At each value of Y, further slices of hue are associated representing lighter and darker colors. At both the dark and the light end of the Y scale, the colors are less intense, and thus chroma is inevitably low. For this reason, color space is often depicted as a sphere, although in truth it is more an irregular cylinder in shape.

Using the CIE notation, the grey or light colored compositions which benefit most from the present invention, can be identified as those colors, including whites, satisfying the following criteria:

$$C^* < C_{critical} \qquad \text{equation 1}$$

$$Y > mC^* + 35 \qquad \text{equation 2}$$

where m and $C_{critical}$ take the values in Table 1 below.

TABLE 1

| Hue angle $h^*$ | m | $C_{critical}$ |
|---|---|---|
| 0 | 0.098 | 39.063 |
| 10 | 0.063 | 42.739 |
| 20 | 0.231 | 40.130 |
| 30 | 0.399 | 37.522 |
| 40 | 0.498 | 37.444 |
| 50 | 0.579 | 38.000 |
| 60 | 0.655 | 39.500 |
| 70 | 0.732 | 41.000 |
| 80 | 0.793 | 45.286 |
| 90 | 0.854 | 49.571 |
| 100 | 0.803 | 47.136 |
| 110 | 0.740 | 43.955 |
| 120 | 0.663 | 41.727 |
| 130 | 0.580 | 39.909 |
| 140 | 0.498 | 38.565 |
| 150 | 0.416 | 37.696 |
| 160 | 0.346 | 37.381 |
| 170 | 0.318 | 39.586 |
| 180 | 0.283 | 40.850 |
| 190 | 0.190 | 39.350 |
| 200 | 0.101 | 38.000 |
| 210 | 0.060 | 38.000 |
| 220 | 0.021 | 38.333 |
| 230 | −0.007 | 40.000 |
| 240 | −0.041 | 40.314 |
| 250 | −0.083 | 38.600 |
| 260 | −0.125 | 36.886 |
| 270 | −0.167 | 35.171 |
| 280 | −0.152 | 34.640 |
| 290 | −0.131 | 34.240 |
| 300 | −0.079 | 34.000 |
| 310 | 0.016 | 34.000 |
| 320 | 0.112 | 34.000 |
| 330 | 0.207 | 34.000 |
| 340 | 0.235 | 34.471 |
| 350 | 0.161 | 35.647 |
| 360 | 0.098 | 39.063 |

Above the $C_{critical}$ value the color intensity is too high to be perceived as a pastel color.

The values of m and $C_{critical}$ at intermediate hue angles can be calculated by linear interpolation.

The table enables the calculation of C* and Y for any given hue and thus the whites, grey or pastel/light shades are explicitly identified.

Coatings having chroma, C* less than about 5 and a Y value more than 95 are perceived by the human eye as white.

The values of C*, Y and h* of any color may be calculated from the spectral reflectance curve of the color, measured using a spectrophotometer in accordance with the manufacturers instructions. A suitable spectrophotometer is the Datacolor Spectraflash SF 600.

Preferably, the dried coating compositions of the invention satisfy equations 1 and 2. More preferably, the dried coating compositions have a chroma less than 5 and a Y value greater than 85.

Preferably, the gloss value of the dried coating is less than 30%, when measured at 85°, more preferably less than 20%, even more preferably less than 10%, yet more preferably less than 5% and most preferably from 2 to 8%.

The coating composition may also contain other ingredients that are standard for coatings such as waxes, rheological modifiers, surfactants, anti-foams, tackifiers, plasticizers, crosslinking agents, flow aids, biocides and clays.

In another aspect of the invention there is provided a method of coating an article or structure having a surface with a composition according to the present invention including the steps of applying at least one liquid layer of the coating by brush, roller, pad or spray and allowing or causing the layer to dry and/or harden.

In a further aspect of the invention there is provided an article or structure having a surface coated with a composition according to the present invention.

The following ingredients were used in preparing the examples.

Tioxide™ TR92 is a Rutile form of $TiO_2$ (density of 4.05 g/cm$^3$) available from Huntsman Tioxide Europe Ltd, Hartlepool, Cleveland, United Kingdom.

Microdol™ H200 and H600 are both dolomites (density of 2.85 g/cm$^3$) and are available from Omya, Omya House, Derby, United Kingdom.

Socal™ P3 is precipitated calcium carbonate (density of 2.70 g/cm$^3$) and is available from Solvay, Rheinberg, Germany.

China Clay Supreme-kaolin (density 2.60 g/cm$^3$) is available from Imerys.

Ropaque™ Ultra E is a 30% non-vol dispersion of hollow polymeric spherical particles (density of 0.591 g/cm$^3$) and is available from Rohm and Haas, Philadelphia, USA.

Steabright™ is a talc (density of 2.78 g/cm$^3$) available from Rio Tinto PLC, London, United Kingdom.

Texanol™ is an ester alcohol coalescent available from Eastman Chemical Company, Tennessee, USA.

TegMer™ 804 is a tetra ethylene glycol ester available from Hallstar, 120 South Riverside Plaza, Suite 1620, Chicago, Ill. 60606, USA.

Orotan™ 731 A is a pigment dispersing agent (25 wt % non-vol; density of non-vol is 1 g/cm$^3$) available from Rohm & Haas Philadelphia, USA.

Disponil™ A1580 is a surfactant (80 wt % non-vol; density of non-vol is 1.00 g/cm$^3$) and is available from Cognis Deutschland GmbH & Co. KG. PO Box 130164, Germany.

Dispex N40 is a dispersant available from Ciba.

Dispelair™ CF 823 is a defoamer (60 wt % non-vol; density of non-vol is 1.00 g/cm$^3$) and is available from Blackburn Chemicals Ltd, Whitebirk Industrial Estate, Blackburn, United Kingdom.

Blanose™ 7M 31C SCS 9554 (density 1.59 g/cm$^3$) is available from Hercules GmbH, Dusseldorf, Germany.

Acticide CHR 0107 a biocide is available from Thor at Wincham Avenue, Wincham, Northwich, Cheshire, England.

Aquaflow™ NHS 300 (23 wt % non-vol; density of non-vol is 1.00 g/cm$^3$) is a thickener/rheology modifier and is available from Hercules GmbH, Dusseldorf, Germany.

China Clay Supreme (density is 2.60 g/cm$^3$) is available from Imerys.

Latex 1 is a styrene/butyl acrylate/methacrylic acid copolymer of Tg 10° C. and Acid value 23.5 mg KOH/g polymer and 50 wt % solids content.

Latex 2 is a styrene/butyl acrylate/methacrylic acid copolymer of Tg –10° C. and Acid Value 23.5 mg KOH/g polymer and 50 wt % solids content.

Latex 3 is a styrene/butyl acrylate/methacrylic acid copolymer of Tg 10° C. and Acid Value 11 mg KOH/g polymer and 50 wt % solids content.

The following test methods were used:

Molecular Weight of Dispersant

Aqueous GPC was used set up was used to measure molecular weight.

The equipment and conditions used were:
Columns: 2×30 cm TSK GMPWXL GPC columns from Tosoh
Eluent: 0.3M Sodium Nitrate, 0.01M Sodium Phosphate with pH adjusted to 7.5 using 0.1M NaOH
Flow rate: 1.0 ml/min
Detector: Waters 410 differential refractive index detector.
Software: Waters Millennium 32 v3.05.01

The instrument was calibrated with Dextran standards covering the range 342-401000 g/mol.

Samples were prepared by diluting 0.1 g in 10 mls of eluent and filtering through a 0.45 micron PVDF membrane.

Injection Volume was 100 μl

Opacity (Contrast Ratio)

Opacity was measured in accordance with BS 3900-D4.

At least 90% is considered acceptable.

The measured opacity is not linear in its relationship to how the eye perceives opacity. Thus, small differences in measured opacity are seen by the eye as much larger differences.

Gloss

Gloss was measured in accordance with BS EN ISO 2813, BS 3900-D5.

Wet Scrub Resistance

Scrub resistance of the dried film was measured in accordance with BS EN ISO 11998 using 200 cycles with the modification that the loss was recorded as mg/cm$^2$. A loss of less than 6 mg/cm$^2$ removal is acceptable.

High Shear Viscosity

The high shear viscosity is measured at 25° C. using an ICI Cone and Plate viscometer (available from Research Equipment London Ltd, London, TW2 5NX) operating at 10,000 s$^{-1}$.

Rotothinner Viscosity (Paint)

The medium shear viscosity is measured at 25° C. using a Rotothinner viscometer (available from Sheen Instruments Ltd, Kingston-upon-Thames, Surrey, UK) fitted with a standard disc rotor rotating at about 562 rpm which is equivalent to a shear rate of ca 250 s$^{-1}$.

Particle Size of Extenders

Particle size of the extenders was measured using a Mastersizer in accordance with ISO 13323 part 1 & 2.

Method for Determining Dispersant Demand

The basis of the test is to gradually add dispersant to an aqueous dispersion of the inorganic opacifying pigment and non-opacifying extender particles whilst measuring viscosity until a minimum viscosity is reached. The amount of dispersant added to achieve this viscosity expressed as wt % non-vol dispersant calculated on the weight of the particles is the dispersant demand. The amounts of the ingredients used are taken from the weight % formulation.

The following method was used to determine the dispersant demand:

1. To a 500 cm³ lacquered metal can arranged to be stirred with a high speed stirrer (HSD) fitted with a 40 to 50 mm blade add approximately 150 g of water. The exact amount of water will depend on the formulation.

2. Add about 50 to 65 wt % of the expected final amount of candidate dispersant—this may require a first titration to make an initial estimate of the dispersant demand in order to make a more accurate second determination.

3. Whilst stirring at about 200 rpm, add all of the ingredients other than opacifying pigments, non-opacifying extender particles, thickener, biocide and the binder, to the mixture in step 2. Stir for a further 2 minutes.

4. Add the non-opacifying extender particles and the non-polymeric opacifying pigment other than any colored opacifying pigment. Increase the stirring during the addition to about 2500 rpm or as required to maintain a vortex in the can. The solids of the mixture at this stage should be about 70 wt %.

5. Measure the viscosity using a Rotothinner viscometer fitted with a ball rotor rotating at 562 rpm. For convenience, the viscosity at this stage should be approximately 6.0 to 7.0 Pa·s. Some trial and error may be necessary to achieve this. If it is so high that it cannot be stirred, additional dispersant and/or water may be added. For some extender combinations the viscosity might be too high or low, in which case, start from step 1, this time using either more or less water as required.

6. Add more dispersant to the mixture and mix in using the HSD.

7. Repeat steps 5 and 6 until the viscosity change, on further addition of dispersant, is small compared to earlier additions.

8. The dispersant demand is estimated by plotting a graph of viscosity vs. added dispersant expressed as wt % dispersant calculated on the sum of the weight of the opacifying pigment particles and the weight of the non-opacifying extender particles. The minimum amount of non-vol. dispersant to achieve the minimum viscosity is taken as the dispersant demand.

The candidate dispersant should be used at as high a non-vol. content as possible to avoid viscosity drops as a result of simple dilution.

The Rotothinner viscometer (Ref 455N/15) is available from Sheen Instruments, 2, Gatton Park Business Centre, Wells Place, Redhill, Surrey, RH1 3LG.

By way of example, the dispersant demand (for Orotan 731) of example 1 was determined as follows:

1. To a 500 cm³ lacquered metal can arranged to be stirred with a high speed disperser (HSD) fitted with a 40 to 50 mm blade add 128 g of water.

2. To this was added 5.3 g of Orotan 731 as supplied at 25% active.

3. Then Texanol (17.7 g), Disponil A1580 (4.42 g) and Dispelair CF823 (1.15 g) was added to the mixture in step 2 and stirred for 2 minutes at 200 rpm.

4. Whilst stirring slowly a pre-mixed blend of Microdol H600 (75.2 g), Socal P3 (110.57 g), China Clay Supreme (48.65 g), Steabright (75.2 g), Microdol H200 (75.2 g) and Tioxide TR92 (57.5 g) was added. The stirrer speed was increased during the addition to 2500 rpm and maintained for 5 minutes.

5. The Rotothinner viscosity was measured as 6.5 Pa·s

6. Then an extra 0.87 g of Orotan 731 (at 25% active) was added and the mixture was dispersed at 2500 rpm for another 2 minutes and the Rotothinner viscosity was measured as 5.4 Pa·s.

7. This was repeated until the viscosity of 2.2 Pa·s was reached. As can be seen from the plot in FIG. 1, dispersant was added past this minimum viscosity point in order to estimate the dispersant demand.

For Orotan 731, a total of 8.76 g of dispersant was added to reach the minimum viscosity. The dispersant demand was 0.50 wt %.

|  | wt % | wt/g |
|---|---|---|
| Water | 21.25 | 128.00 |
| Texanol | 2.94 | 17.70 |
| Orotan 731 | 1.45 | 8.76 |
| Disponil A1580 | 0.73 | 4.42 |
| Dispelair CF823 | 0.19 | 1.15 |
| Microdol H600 | 12.48 | 75.20 |
| Socal P3 | 18.37 | 110.57 |
| China Clay Supreme | 8.08 | 48.65 |
| Steabright | 12.48 | 75.20 |
| Microdol H200 | 12.48 | 75.20 |
| Tioxide TR92 | 9.55 | 57.50 |

Note that, other than the water, the ingredients are in the correct ratio relative to each other. The reduced water content allows the viscosity minimum to be detected.

FIG. 1 shows a plot of viscosity against added non vol. dispersant for various dispersants:

Line A represents the plot for Dispex N40 (Dispersant demand 0.12 wt %);

Line B represents the plot for potassium tripolyphosphate;

Line C represents the plot for Orotan 731 (Dispersant demand 0.50 wt %);

Line D represents the plot for Strodex PK-80A;

Line E represents the plot for Orotan 681 (Dispersant demand 1.50 wt %);

Line F represents the plot for Nuosperse FA-196.

Of these, only Orotan 681 and Orotan 731 are suitable for use in the present invention as these are the only two of molecular weight greater than Mw. 3500 Daltons and of dispersant demand greater than 0.35 wt %.

EXAMPLES

The invention will now be illustrated by the following examples.

Numbered examples are of the invention and comparative examples are referenced with letters. In all cases the wt % formulation refers to the liquid paint and the vol % to the dried coating.

The following method was used to make the paints in each case.

Millbase Stage

Using a 5 liter metal dispersion vessel, load the Water (1), Texanol, Orotan or Dispex, Disponil, Acticide and half the amount of Dispelair. Place vessel under High Speed Disperser fitted with a saw tooth blade. Stir at slow speed so that no splashing is observed. Add Microdol H200 and H600, Socal P3, China Clay Supreme, Steabright and Tioxide TR92, run for 2 minutes at slow speed then add Blanose thickener. Over 5 minutes slowly increase the speed as the paint thickens. Unit should be running at approximately 2500 r.p.m. (depending on volume), but without splashing. Stir for a further 30 minutes. Stop unit half way through to ensure no pigment has stuck to sides/base of vessel by hand stirring. Turn unit back on to high speed, after 30 minutes reduce to slow speed. Check the state of dispersion of the millbase for bits by brushing out on a card. If acceptable amount of bits, add Water (2) and run for a further 2 minutes and then switch off the stirrer.

The total amount of water showed in the example formulation was in the ratio of: water (1):water (2):water (3)=45.5: 30.3:24.2

Paint Stage

Load Latex 1 into a suitably sized vessel and place under a stirrer fitted with a paddle blade.

Load Ropaque, the rest of the Dispelair, the Millbase prepared above, Water (3) and Aquaflow. Adjust the stirrer speed as the volume in the vessel increases, being careful to avoid splashing.

Stir for a further 15 minutes at low speed (approx. 500 r.p.m)

Examples 1 and A

Examples 1 and A are essentially identical other than for the difference in PVC Comparative example A, at PVC 86, fails the wet scrub test.

|  | Example | | | |
|---|---|---|---|---|
|  | 1 | | A | |
|  | wt % (wet coating) | vol % (dry coating) | wt (% of wet coating) | vol % (dry coating) |
| Aquaflow NHS 300 | 1.50 | 1.01 | 1.50 | 1.06 |
| Acticide CHR 0107 | 0.24 | 0.07 | 0.24 | 0.08 |
| Disponil A1580 | 0.50 | 1.60 | 0.5 | 1.68 |
| Dispelair CF823 | 0.23 | 0.60 | 0.23 | 0.63 |
| Orotan731 A | 1.00 | 0.65 | 1.00 | 0.69 |
| Blanose 7M 31C | 0.50 | 1.32 | 0.50 | 1.39 |
| Texanol | 2.00 | 0 | 2.00 | 0 |
| Water (Mains) | 33.53 | 0 | 36.06 | 0 |
| Tioxide TR92 | 6.50 | 6.77 | 6.50 | 7.12 |
| Socal P3 | 12.50 | 19.43 | 12.50 | 20.44 |
| Steabright | 8.50 | 12.83 | 8.50 | 13.50 |
| China Clay Supreme | 5.50 | 8.88 | 5.50 | 9.34 |
| Microdol H600 | 8.50 | 12.97 | 8.50 | 13.64 |
| Microdol H200 | 8.50 | 12.74 | 8.50 | 13.40 |
| Ropaque (Tm) Ultra E | 4.00 | 8.49 | 4.00 | 8.93 |
| Latex 1 | 6.50 | 12.63 | 3.97 | 8.11 |
| Total | 100.00 | 100.00 | 100.00 | 100.00 |
| Wet scrubs weight loss (mg/cm$^2$) |  | 5.8 |  | 16.5 |
| Density (kg/L) |  | 1.49 |  | 1.49 |
| PVC (%) |  | 82.12 |  | 86.37 |
| vol % solids |  | 35.55 |  | 33.77 |
| Sum non-opacifying particles (% of dry vol) |  | 66.86 |  | 70.31 |

The Tg of the polymer binder in the presence of the coalescing solvent is calculated using equation 1 as previously discussed $$1/Tg = V_p/Tg_p + \alpha V_s/Tg_s \qquad \text{equation 1}$$

The Tg of Texanol is −84° C.

The volume fractions are calculated based on the polymer and the solvent alone. So for example 1 the total weight % of polymer is 3.25 (being 50% of 6.5) and the solvent is 2.00. The specific gravity of the polymer and the solvent is 1.08 and 0.95 respectively, and the volume fraction is therefore 0.15 and 0.85 respectively. So the Tg of the polymer in the presence of the Texanol is −9.5° C.

Examples 2 and B

These are essentially identical other than the level of China Clay Supreme (kaolin). Comparative example B, at a kaolin level of 28.52 vol % fails the wet scrubs test.

|  | Example | | | |
|---|---|---|---|---|
|  | 2 | | B | |
|  | wt % (wet coating) | vol % (dry coating) | wt (% of wet coating) | vol % (dry coating) |
| Aquaflow NHS 300 | 1.50 | 1.02 | 0.50 | 0.36 |
| Acticide CHR 0107 | 0.24 | 0.07 | 0.25 | 0.08 |
| Disponil A1580 | 0.50 | 1.62 | 0.50 | 1.70 |
| Dispelair CF823 | 0.25 | 0.66 | 0.25 | 0.69 |
| Orotan731 A | 1.00 | 0.66 | 1.50 | 1.04 |
| Blanose 7M 31C | 0.70 | 1.87 | 0.50 | 1.40 |
| Texanol | 2.00 | 0 | 1.00 | 0 |
| Water (Mains) | 33.65 | 0 | 38.13 | 0 |
| Tioxide TR92 | 7.50 | 7.91 | 5.97 | 6.61 |
| Socal P3 | 12.61 | 19.84 | 5.76 | 9.51 |
| Steabright | 8.44 | 12.89 | 11.37 | 18.24 |
| China Clay Supreme | 5.53 | 9.03 | 16.63 | 28.52 |
| Microdol H600 |  | 0 |  | 0 |
| Microdol H200 | 16.88 | 25.61 | 10.5 | 16.72 |
| Ropaque (Tm) Ultra E | 4.00 | 8.60 | 2.08 | 4.69 |
| Latex 1 | 5.20 | 10.22 | 5.06 | 10.45 |
| Total | 100.00 | 100.00 | 100.00 | 100.00 |
| Wet scrubs weight loss (mg/cm$^2$) |  | 5.2 |  | 17.94 |
| Contrast Ratio |  | 93.3 |  | 94.18 |
| Density (kg/L) |  | 1.5 |  | 1.5 |
| PVC (%) |  | 83.9 |  | 84.3 |
| vol % solids |  | 35.6 |  | 33.4 |
| Sum non-opacifying particles (% of dry vol) |  | 67.4 |  | 73.0 |

Examples 3 and C

Examples 3 and C are identical except that the Tg of the latex in the two examples is different. Comparative example C, using a latex of Tg −10° C., fails the wet scrubs test.

|  | Example | | | |
|---|---|---|---|---|
|  | 3 | | C | |
|  | wt % (wet coating) | vol % (dry coating) | wt (% of wet coating) | vol % (dry coating) |
| Aquaflow NHS 300 | 1.50 | 1.01 | 1.50 | 1.01 |
| Acticide CHR 0107 | 0.24 | 0.07 | 0.24 | 0.07 |
| Disponil A1580 | 0.50 | 1.60 | 0.50 | 1.60 |
| Dispelair CF823 | 0.23 | 0.60 | 0.23 | 0.60 |
| Orotan731 A | 1.00 | 0.65 | 1.00 | 0.65 |
| Blanose 7M 31C | 0.50 | 1.32 | 0.50 | 1.32 |
| Texanol | 2.00 | 0 | 2.00 | 0 |
| Water | 33.53 | 0 | 33.53 | 0 |
| Tioxide TR92 | 6.50 | 6.77 | 6.50 | 6.77 |
| Socal P3 | 12.50 | 19.43 | 12.50 | 19.43 |
| Steabright | 8.50 | 12.83 | 8.50 | 12.83 |
| China Clay Supreme | 5.50 | 8.88 | 5.50 | 8.88 |
| Microdol H600 | 8.50 | 12.97 | 8.50 | 12.97 |
| Microdol H200 | 8.50 | 12.74 | 8.50 | 12.74 |
| Ropaque (Tm) Ultra E | 4.00 | 8.49 | 4.00 | 8.49 |
| Latex 1 | 6.50 | 12.63 | 0 | 0 |
| Latex 2 | 0 | 0 | 6.5 | 12.63 |
| Total | 100.00 | 100.00 | 100.00 | 100.00 |
| Wet scrubs weight loss (mg/cm$^2$) |  | 4.9 |  | 7.4 |
| Density (kg/L) |  | 1.49 |  | 1.49 |
| PVC (%) |  | 82.12 |  | 82.12 |

Examples 4 and D

Effect of Latex Acid Value

Comparative example D, using latex 3 of AV 11 mg KOH/g polymer, fails the wet scrubs test.

|  | Example 3 | | C | |
|---|---|---|---|---|
|  | wt % (wet coating) | vol % (dry coating) | wt (% of wet coating) | vol % (dry coating) |
| vol % solids |  | 35.55 |  | 35.55 |
| Sum non-opacifying particles (% of dry vol) |  | 66.86 |  | 66.86 |

|  | Example 4 | | D | |
|---|---|---|---|---|
|  | wt % (wet coating) | vol % (dry coating) | wt (% of wet coating) | vol % (dry coating) |
| Aquaflow NHS 300 | 1.50 | 1.01 | 1.50 | 1.01 |
| Acticide CHR 0107 | 0.24 | 0.07 | 0.24 | 0.07 |
| Disponil A1580 | 0.50 | 1.60 | 0.50 | 1.60 |
| Dispelair CF823 | 0.23 | 0.60 | 0.23 | 0.60 |
| Orotan731 A | 1.00 | 0.65 | 1.00 | 0.65 |
| Blanose 7M 31C | 0.50 | 1.32 | 0.50 | 1.32 |
| Texanol | 2.00 | 0 | 2.00 | 0 |
| Water | 33.53 | 0 | 33.53 | 0 |
| Tioxide TR92 | 6.50 | 6.77 | 6.50 | 6.77 |
| Socal P3 | 12.5 | 19.43 | 12.5 | 19.43 |
| Steabright | 8.50 | 12.83 | 8.50 | 12.83 |
| China Clay Supreme | 5.50 | 8.88 | 5.50 | 8.88 |
| Microdol H600 | 8.50 | 12.97 | 8.50 | 12.97 |
| Microdol H200 | 8.50 | 12.74 | 8.50 | 12.74 |
| Ropaque (Tm) Ultra E | 4.00 | 8.49 | 4.00 | 8.49 |
| Latex 1 | 6.50 | 12.63 |  |  |
| Latex 3 |  |  | 6.50 | 12.63 |
| Total | 100.00 | 100.00 | 100.00 | 100.00 |
| Wet scrubs weight loss (mg/cm$^2$) |  | 3.6 |  | 8.0 |
| Density (kg/L) |  | 1.49 |  | 1.49 |
| PVC (%) |  | 82.12 |  | 82.12 |
| vol % solids |  | 35.55 |  | 35.55 |
| Sum non-opacifying particles (% of dry vol) |  | 66.86 |  | 66.86 |

Example 5 and E

Effect of Using a Dispersant Producing a Dispersant Demand of <0.45 wt %

|  | Example 5 | | E | |
|---|---|---|---|---|
|  | wt % (wet coating) | Vol % (dry coating) | wt (% of wet coating) | vol % (dry coating) |
| Aquaflow NHS 300 | 0.50 | 0.34 | 0.50 | 0.34 |
| Acticide CHR 0107 | 0.24 | 0.07 | 0.24 | 0.07 |
| Disponil A1580 | 0.50 | 1.61 | 0.50 | 1.62 |
| Dispelair CF823 | 0.25 | 0.65 | 0.25 | 0.66 |
| Orotan731 A | 1.00 | 0.66 |  |  |
| Dispex N40 |  |  | 0.20 | 0.23 |
| Blanose 7M 31C | 0.50 | 1.33 | 0.50 | 1.33 |
| Texanol | 2.00 | 0 | 2.00 | 0 |
| Water (Mains) | 34.51 | 0 | 35.31 | 0 |
| Tioxide TR92 | 6.50 | 6.81 | 6.50 | 6.84 |
| Socal P3 | 12.50 | 19.55 | 12.50 | 19.64 |
| Steabright | 8.50 | 12.91 | 8.50 | 12.97 |
| China Clay Supreme | 5.50 | 8.93 | 5.50 | 8.97 |
| Microdol H600 | 8.50 | 13.05 | 8.50 | 13.11 |
| Microdol H200 | 8.50 | 12.82 | 8.50 | 12.88 |
| Ropaque (Tm) Ultra E | 4.00 | 8.55 | 4.00 | 8.58 |
| Latex 1 | 6.50 | 12.71 | 6.50 | 12.76 |
| Total | 100.00 | 100.00 | 100.00 | 100.00 |
| Wet scrubs weight loss (mg/cm$^2$) |  | 4.6 |  | 9.0 |
| Contrast Ratio |  | 93.19 |  | 93.3 |
| Density (kg/L) |  | 1.49 |  | 1.49 |
| PVC (%) |  | 82.63 |  | 82.99 |
| vol % solids |  | 35.31 |  | 35.12 |
| Sum non-opacifying particles (% of dry vol) |  | 67.27 |  | 67.56 |

Dispersant demand for Comparative example E is <0.45 wt %.

Examples 6 and F

Effect of Non-Fugitive Coalescing Solvent

|  | Example 6 | | F | |
|---|---|---|---|---|
|  | wt % (wet coating) | Vol % (dry coating) | wt (% of wet coating) | vol % (dry coating) |
| Aquaflow NHS 300 | 1.50 | 1.01 | 1.50 | 0.97 |
| Acticide CHR 0107 | 0.24 | 0.07 | 0.24 | 0.07 |
| Disponil A1580 | 0.50 | 1.60 | 0.50 | 1.53 |
| Dispelair CF823 | 0.25 | 0.65 | 0.25 | 0.62 |
| Orotan731 A | 1.00 | 0.65 | 1.00 | 0.63 |
| Blanose 7M 31C | 0.50 | 1.32 | 0.50 | 1.27 |
| Texanol | 1.00 | 0 | 0 | 0 |
| Tegmer 804 |  |  | 1.00 | 4.10 |
| Water | 34.51 | 0 | 34.51 | 0 |
| Tioxide TR92 | 6.50 | 6.77 | 6.50 | 6.49 |
| Socal P3 | 12.50 | 19.42 | 12.50 | 18.62 |
| Steabright | 8.50 | 12.83 | 8.50 | 12.30 |
| China Clay Supreme | 5.50 | 8.87 | 5.50 | 8.51 |
| Microdol H600 | 8.50 | 12.97 | 8.50 | 12.43 |
| Microdol H200 | 8.50 | 12.73 | 8.50 | 12.21 |
| Ropaque (Tm) Ultra E | 4.00 | 8.49 | 4.00 | 8.14 |
| Latex 1 | 6.50 | 12.62 | 6.50 | 12.11 |
| Total | 100.00 | 100.00 | 100.00 | 100.00 |
| Wet scrubs weight loss (mg/cm$^2$) |  | 4.3 |  | 18.0 |
| Density (kg/L) |  | 1.49 |  | 1.49 |
| PVC (%) |  | 82.08 |  | 78.71 |
| vol % solids |  | 35.60 |  | 37.14 |
| Sum non-opacifying particles (% of dry vol) |  | 66.82 |  | 64.08 |

Example 7

A Coating Free of Hollow Polymeric Particles

|  | wt (% of wet coating) | vol % (dry coating) |
|---|---|---|
| Aquaflow NHS 300 | 1.48 | 1.10 |
| Acticide CHR 0107 | 0.24 | 0.08 |
| Disponil A1580 | 0.50 | 1.77 |
| Dispelair CF823 | 0.23 | 0.66 |
| Orotan731 A | 1.00 | 0.72 |
| Blanose 7M 31C | 0.49 | 1.43 |
| Texanol | 2.00 | 0 |
| Water (Mains) | 38.43 | 0 |
| Tioxide TR92 | 6.54 | 7.54 |
| Socal P3 | 12.32 | 21.21 |
| China Clay Supreme | 5.55 | 9.93 |
| Microdol H200 | 16.43 | 27.27 |
| Omyacoat 850 OG | 8.22 | 14.14 |
| Ropaque (Tm) Ultra E | 0 | 0 |
| 935-1052 std | 6.57 | 14.14 |
| Total | 100.00 | 100.00 |
| Wet scrubs weight loss (mg/cm$^2$) |  | 4.0 |
| Contrast Ratio |  | 93.05 |
| Density (kg/L) |  | 1.48 |
| PVC (%) |  | 80.10 |
| vol % solids |  | 31.77 |
| Sum non-opacifying particles (% of dry vol) |  | 72.53 |

Standards (i) and (ii)

Standards (i) and (ii) show that at PVC<78% any dispersant may be used without compromising the wet scrubs. Dispex N40, used in standard (ii), does not satisfy the dispersant demand criterion of <0.35 wt %, but the coating passes the wet scrubs test.

|  | Standard | | | |
|---|---|---|---|---|
|  | (i) | | (ii) | |
|  | wt % (wet coating) | vol % (dry coating) | wt % (of wet coating) | vol % (dry coating) |
| Aquaflow NHS 300 | 1.50 | 0.97 | 1.50 | 0.97 |
| Acticide CHR 0107 | 0.24 | 0.07 | 0.24 | 0.07 |
| Disponil A1580 | 0.50 | 1.54 | 0.50 | 1.54 |
| Dispelair CF823 | 0.25 | 0.62 | 0.25 | 0.63 |
| Orotan 731 A | 1.00 | 0.63 |  |  |
| Dispex N40 |  |  | 0.25 | 0.28 |
| Blanose 7M 31C | 0.70 | 1.78 | 0.70 | 1.78 |
| Texanol | 2.00 | 0 | 2.00 | 0 |
| Water | 31.41 | 0 | 32.16 | 0 |
| Tioxide TR92 | 8.00 | 8.01 | 8.00 | 8.03 |
| Socal P3 | 11.5 | 17.18 | 11.5 | 17.24 |
| Steabright | 8.00 | 11.60 | 8.00 | 11.65 |
| China Clay Supreme | 5.00 | 7.76 | 5.00 | 7.78 |
| Microdol H200 | 15.6 | 22.47 | 15.6 | 22.55 |
| Ropaque (Tm) Ultra E | 4.00 | 8.16 | 4.00 | 8.19 |
| Latex 1 | 10.3 | 19.23 | 10.3 | 19.30 |
| Total | 100.00 | 100.00 | 100.00 | 100.00 |
| Wet scrubs weight loss (mg/cm$^2$) |  | 1.7 |  | 1.7 |
| Contrast Ratio |  | 91.14 |  | 91.63 |
| Density (kg/L) |  | 1.47 |  | 1.47 |
| PVC (%) |  | 75.17 |  | 75.44 |
| vol % solids |  | 36.57 |  | 36.40 |
| Sum non-opacifying particles (% of dry vol) |  | 59.00 |  | 59.21 |

The invention claimed is:

1. An aqueous coating composition having a pigment volume content (PVC) of from 78 to 85% comprising, based on the total volume solids of the dry coating unless otherwise stated:
   a) opacifying pigment particles comprising
      i) from 3 to 10% titanium dioxide,
      ii) from 0 to 20% of hollow polymeric particles;
   b) non-opacifying extender particles comprising at least one of
      i) calcium magnesium carbonate,
      ii) calcium carbonate,
      iii) nepheline syenite, and
      iv) kaolin,
      wherein i)+ii)+iii)+iv)=40 to 80%, and iv)=0 to 20%;
   c) polymer binder particles of calculated Fox Tg of from 5 to 25° C. having an acid value of from 15 to 65 mg KOH/g of polymer, comprising polymer binder particles derived from acrylic monomers and optionally further comprising styrene and/or its derivatives;
   d) a dispersant having a weight average molecular weight of at least 3500 Daltons, and wherein the dispersant demand of a mixture of the opacifying pigment particles, other than the hollow polymeric particles, of a), and the extender particles of b) is greater than 0.35 wt %, calculated on the weight of the titanium dioxide and extender particles, wherein the dispersant demand is estimated by the following method or its equivalent: i) gradually adding dispersant to an aqueous dispersion of the non-polymeric opacifying pigment particles and extender particles and monitoring the viscosity of the resulting mixture to determine the minimum viscosity; and ii) identifying the amount of dispersant added to reach the minimum viscosity as the dispersant demand; and
   e) a fugitive coalescing solvent;
   wherein the composition is free of non-fugitive coalescing solvent.

2. The coating composition according to claim 1 wherein any difference between the actual PVC and the sum of a) and b) is made up with other non-opacifying extender particles.

3. The coating composition according to claim 1 wherein the opacifying pigment particles are white.

4. The coating composition according to claim 3 wherein the white opacifying pigment particles are selected from the group consisting of titanium dioxide and hollow polymeric particles.

5. The coating composition according to claim 1 comprising less than 10% by volume of hollow polymeric particles.

6. The coating composition according to claim 1 wherein the extender particles are selected from the group consisting of calcium magnesium carbonate, calcium carbonate, nepheline syenite and kaolin.

7. The coating composition according to claim 6 wherein from 20 to 50% of the total volume solids of the dry coating comprises extender particles of d50≦2 microns.

8. The coating composition according to claim 1 wherein the polymer binder particles have a calculated Fox Tg of from 6 to 21° C.

9. The coating composition according to claim 1 wherein the polymer binder particles are derived from styrene, butyl acrylate and acrylic acid.

10. The coating composition according claim 1 comprising from 5 to 20% of the dried coating of the polymer binder particles.

11. The coating composition according to claim 1 wherein the acid value of the polymer binder particles is from 15 to 60 mg KOH/g of polymer.

12. The coating composition according to claim 11 wherein the polymer binder particles comprise acrylic acid and/or methacrylic acid and/or maleic acid and/or its anhydride.

13. The coating composition according to claim 1 comprising up to 4 wt % of the fugitive coalescing solvent based on the liquid formulation.

14. The coating composition according to claim 1 wherein the fugitive coalescing solvent reduces the calculated Fox Tg of the polymer binder particles to from −10 to −80° C.

15. The coating composition according to claim 1 further containing color pigments.

16. The coating composition according to claim 1 having a sheen of less than 15% when measured at 85°.

17. A method of coating an article or structure, the method comprising the steps of:
   applying by brush, roller, pad or spray at least one liquid layer of the coating composition according to claim 1 to a surface of the article or structure;
   allowing or causing the layer to dry and/or harden.

18. An article or structure having a surface coated with the coating composition according to claim 1.

* * * * *